US007752665B1

(12) United States Patent
Robertson et al.

(10) Patent No.: US 7,752,665 B1
(45) Date of Patent: Jul. 6, 2010

(54) DETECTING PROBES AND SCANS OVER HIGH-BANDWIDTH, LONG-TERM, INCOMPLETE NETWORK TRAFFIC INFORMATION USING LIMITED MEMORY

(75) Inventors: Seth Jerome Robertson, Brooklyn, NY (US); Salvatore J. Stolfo, Ridgewood, NJ (US)

(73) Assignee: TCS Commercial, Inc., Hemdon, VA (US)

( * ) Notice: Subject to any disclaimer, the term of this patent is extended or adjusted under 35 U.S.C. 154(b) by 1042 days.

(21) Appl. No.: 10/620,156

(22) Filed: Jul. 14, 2003

Related U.S. Application Data

(60) Provisional application No. 60/395,318, filed on Jul. 12, 2002.

(51) Int. Cl.
*G06F 11/30* (2006.01)
*G08B 23/00* (2006.01)
*G06F 12/14* (2006.01)

(52) U.S. Cl. ............................ 726/23; 726/11; 726/22; 713/154

(58) Field of Classification Search ................ 726/11, 726/23, 22; 713/154
See application file for complete search history.

(56) References Cited

U.S. PATENT DOCUMENTS

| 5,991,881 | A * | 11/1999 | Conklin et al. ............... 726/22 |
| 6,026,442 | A * | 2/2000 | Lewis et al. ................. 709/229 |
| 6,279,113 | B1 * | 8/2001 | Vaidya ......................... 726/23 |
| 6,301,668 | B1 * | 10/2001 | Gleichauf et al. ............. 726/25 |
| 6,424,654 | B1 * | 7/2002 | Daizo ........................... 370/401 |
| 6,453,345 | B2 * | 9/2002 | Trcka et al. ................... 709/224 |
| 7,051,369 | B1 * | 5/2006 | Baba ............................. 726/23 |
| 7,120,931 | B1 * | 10/2006 | Cheriton ...................... 726/13 |
| 7,181,768 | B1 * | 2/2007 | Ghosh et al. .................. 726/23 |
| 7,185,368 | B2 * | 2/2007 | Copeland, III ............... 726/25 |
| 7,203,963 | B1 * | 4/2007 | Wu et al. ...................... 726/23 |
| 7,213,264 | B2 * | 5/2007 | Poletto et al. ................. 726/22 |
| 7,266,602 | B2 * | 9/2007 | Givoly ......................... 709/224 |
| 2002/0032871 | A1 * | 3/2002 | Malan et al. ................. 713/201 |
| 2002/0035683 | A1 * | 3/2002 | Kaashoek et al. ........... 713/154 |

(Continued)

OTHER PUBLICATIONS

Lee, Cynthia et al. "Detection and Characterization of Port Scan Attacks", Mar. 2003.*

*Primary Examiner*—Michael J Simitoski
(74) *Attorney, Agent, or Firm*—Woodcock Washburn LLP

(57) ABSTRACT

A method for detecting surveillance activity in a computer communication network comprising automatic detection of malicious probes and scans and adaptive learning. Automatic scan/probe detection in turn comprises modeling network connections, detecting connections that are likely probes originating from malicious sources, and detecting scanning activity by grouping source addresses that are logically close to one another and by recognizing certain combinations of probes. The method is implemented in a scan/probe detector, preferably in combination with a commercial or open-source intrusion detection system and an anomaly detector. Once generated, the model monitors online activity to detect malicious behavior without any requirement for a priori knowledge of system behavior. This is referred to as "behavior-based" or "mining-based detection." The three main components may be used separately or in combination with each other. The alerts produced by each may be presented to an analyst, used for generating reports (such as trend analysis), or correlated with alerts from other detectors. Through correlation, the invention prioritizes alerts, reduces the number of alerts presented to an analyst, and determines the most important alerts.

19 Claims, 13 Drawing Sheets

U.S. PATENT DOCUMENTS

2002/0174362 A1* 11/2002 Ullmann et al. .............. 713/201
2003/0188189 A1* 10/2003 Desai et al. .................. 713/201
2003/0196095 A1* 10/2003 Jeffries et al. ............... 713/181
2003/0226035 A1* 12/2003 Robert et al. ................ 713/201
2003/0226038 A1* 12/2003 Raanan et al. .............. 713/201
2004/0025044 A1* 2/2004 Day ........................... 713/200

* cited by examiner

Number of Attackers by Attack Length

Number of Attackers by Average Intraprobe Delay

DETECTING PROBES AND SCANS OVER HIGH-BANDWIDTH, LONG-TERM, INCOMPLETE NETWORK TRAFFIC INFORMATION USING LIMITED MEMORY

CLAIM TO PRIORITY

This application claims priority to the U.S. Provisional Patent Application DETECTING PROBES AND SCANS OVER HIGH-BANDWIDTH, LONG-TERM, INCOMPLETE NETWORK TRAFFIC INFORMATION USING LIMITED MEMORY, Ser. No. 60/395,318 that was filed Jul. 12, 2002. This application is incorporated by reference herein.

CROSS-REFERENCE TO RELATED APPLICATIONS

Related applications are:

1. System and Methods for Detection of New Malicious Executables, application Ser. No. 10/208,432, filed Jul. 30, 2002, which claims the benefit of application No. 60/308,622, filed Jul. 30, 2001, and application No. 60/308,623, filed Jul. 30, 2001.

2. System and Methods for Intrusion Detection with Dynamic Window Sizes, application Ser. No. 10/208,402, filed Jul. 30, 2002, now U.S. Pat. No. 7,162,741, which claims priority to application No. 60/308,621, filed Jul. 30, 2001.

3. System and Method for Detecting Malicious Email Transmission, application Ser. No. 10/222,632, filed Aug. 16, 2002, which claims the benefit of application No. 60/340,137, filed Dec. 14, 2001, and application No. 60/312,703, filed Aug. 16, 2001.

4. Methods for Cost-Sensitive Modeling for Intrusion Detection and Response, application Ser. No. 10/269,718, filed Oct. 11, 2002.

5. System and Methods for Anomaly Detection and Adaptive Learning, application Ser. No. 10/269,694, filed Oct. 11, 2002, which claims the benefit of application No. 60/339,952, filed Dec. 13, 2001, and application No. 60/328,682, filed Oct. 11, 2001.

6. Methods of Unsupervised Anomaly Detection Using a Geometric Framework, application Ser. No. 10/320,259, filed Dec. 16, 2002, which claims the benefit of application No. 60/340,196, filed Dec. 14, 2001 and application No. 60/352,894, filed Jan. 29, 2002.

7. System and Methods for Detecting a Denial-of-Service Attack on a Computer System, application Ser. No. 10/327,811, filed Dec. 19, 2002, which claims the benefit of application No. 60/342,872, filed Dec. 20, 2001.

8. System and Methods for Detecting Intrusions in a Computer System by Monitoring Windows Registry Accesses, application Ser. No. 10/352,343, filed Jan. 27, 2003 which claims the benefit of application No. 60/351,857, filed Jan. 25, 2002.

9. System and Methods for Adaptive Model Generation for Detecting Intrusions in Computer Systems, application Ser. No. 10/352,342, filed Jan. 27, 2003, now U.S. Pat. No. 7,225,343, which claims the benefit of application No. 60/351,913, filed Jan. 25, 2002.

All of these applications are incorporated by reference herein.

FIELD OF THE INVENTION

The present invention relates to detection of surveillance and intrusions in computer communication networks.

BACKGROUND OF THE INVENTION

The growth of the Internet has created limitless possibilities for information sharing and electronic commerce. Unfortunately, this growth has created commensurate opportunities for malicious intrusion. Computer network intrusions encompass deliberate attempts to access or manipulate information, to obtain services, or to render a computer system unreliable or unusable. Effective tools and methods are needed to detect intrusions as early as possible, so that effective preemptive action may be taken.

FIG. 1 is a schematic representation of the Internet 110 and several illustrative network devices that are connected by the Internet. Networked users/devices 120 communicate via message packets typically according to the Internet Transmission Control Protocol/Internet Protocol (TCP/IP). Packets contain source Internet Protocol addresses (IP addresses), destination IP addresses, and other information to connect and exchange information between the source and destination computers. Switches 130 receive and forward packets from multiple users within a local network such as network 160 according to packet header information. Routers 140 in turn interconnect two or more local networks and provides connection to the Internet.

Various security measures may be used to protect network users/devices 120. For example, network site/segment 160 connects to the Internet through router 140 and firewall 150. The firewall is placed at the connection point of the local network to the Internet. The firewall actively filters incoming and outgoing traffic, protecting against unauthorized access by computers. Network administrators can grant access to local network 160 only to selected "trusted" users or "safe" services. Outgoing traffic can also be filtered to protect valuable data. The usefulness of the firewall is limited by the need for a priori knowledge of authorized users, services and protected data. In addition, as a consequence of service interruption or other costs, it may be inconvenient to move a firewall from an existing location to a more interesting or convenient one.

Malicious activity may arise from any computer within the network or from multiple computers acting in concert. Typically, the malicious entity launches TCP/IP-based "probes," which are attempts to connect with targeted network devices. "Scans" are systematic groups of probes originating from a single source computer or group of collaborating sources. Scans and probes are executed by malicious users and worms to find opportunities to attack or break into a targeted victim computer, and typically precede the actual attack. The attack itself may be an attempt to breach the security to the computer to obtain, e.g., user identification, access codes or other proprietary information or to interfere with the operation of the computer, e.g., by overloading resources, or redirecting the processing capabilities of the computer. All of these activities—probes, scans and attacks—are view as security threats. As will be appreciated, it is advantageous to detect probing and scanning sources to forewarn of a likely subsequent attempt to attack or break into a target victim computer.

Prior art Intrusion Detection Systems (IDSs) passively monitor network traffic for suspicious activity. As shown in FIG. 1, an IDS 170 utilizes one or more data sensors 180 attached to a network "tap point" 190 to collect and summarize critical parameters. Tap point 190 provides all traffic passing through the point in either direction. The end goal of an IDS is the reliable detection of probes and scans among other intrusive activities such as hacker attacks and break-ins to take control of a target computer. IDSs may utilize dedicated or distributed resources (i.e., resources distributed among sites in a large network).

Prior art intrusion detection methods include misuse detection and anomaly detection. Misuse detection requires a priori knowledge of an attack pattern. Online activity is evaluated with respect of a model of the malicious behavior, and activity that is consistent with the misuse model is flagged. Misuse detection offers the advantage of requiring relatively low computational resources. However, attack signatures must be known, and the misuse model must be designed to encompass all possible variations of the pertinent attack. Unfortunately, malicious users and programmers who write new worms often discover new ways to attack that are not known to programmers who write signature rules to detect attacks; as a result, IDSs often do not detect these attacks.

Anomaly detection evaluates network activity with respect to a model of normal behavior and flags inconsistent activity as anomalous. Anomaly detection systems thus offer the advantage of being able to recognize unknown attacks. In practice, the set of actual intrusive activities is not exactly the same as the set of anomalous activities, i.e., the two sets only intersect. Consequently, anomalous activities that are not intrusive may be incorrectly detected as intrusive ("false positives," or "false alarms"), and actual intrusive activities that are not anomalous may result in events that are not flagged as intrusive ("false negatives"). Detection threshold levels must be chosen to appropriately balance the incidence of these occurrences. In general, it is desirable to maximize the probability of correct detection while regulating the false-positive rate. Anomaly detection systems generally suffer the disadvantage of being computationally expensive (i.e., with regard to CPU and memory resources).

IDSs in general face additional challenges. The asymmetrical nature of network data makes the design of intrusion detection algorithms challenging. "Stealthy" surveillance may be spread over long time spans and may therefore be camouflaged by legitimate traffic. New attack agendas are generally unknown, and deterministic analysis of raw sensor data may be impractical due to imprecise knowledge of the local network configuration Typically, prior art IDSs have been limited to measuring the "spread" of connections from a given source, i.e., if the source connects or attempts to connect to too many destinations in a given time, or if too many connections are attempted in a given amount of time, the source is considered to be malicious. This strategy consumes an intractable quantity of memory when applied to a large network, i.e., one having a large number of network addresses. As a result, it is necessary to limit the amount of time during which statistics are gathered; and stealthy, long duration attacks or very slow probing goes undetected.

For example, SPICE/SPADE has been developed to detect portscans and other stealthy probes. It uses a probabalistic behavioral model to compute an anomaly score. This IDS suffers the disadvantage of requiring large amounts of memory to track packet distributions across combinations of source and destination IP addresses.

EMERALD from SRI International has also been used to detect portscans. It constructs statistical profiles for source IP addresses, and compares a short-term weighted behavior profile (e.g., number of SYN packets) to a long-term weighted profile. If the short-term profile deviates significantly from the long-term profile, the source is considered suspicious. This approach cannot detect slow, stealthy scans and cannot easily correlate distributed source scans.

The SNORT portscan preprocessor is an open-source IDS that looks for a specific quantity of TCP/UDP packets sent to any number of host/port combinations from a single source within a specified time duration. SNORT also looks for single TCP packets having an unusual combination of flags not normally used for TCP connections. SNORT is unable to detect scans originating from multiple hosts. Also, the quantity and duration thresholds are statically computed, making it easy for a malicious party to avoid detection by increasing the time between scanning probes.

The prior art approaches are thus incapable of automatically and effectively detecting slow, stealthy surveillance activities or new, unknown threats, or significant variations of known threats. Accordingly, there is a need for new methods and tools that can automatically detect, characterize and enable effective response to new threats without consuming inordinate computational and human resources.

SUMMARY OF THE INVENTION

In one aspect, the present invention is a generalized scan/probe and attack detector that overcomes the above limitations through the use of machine learning techniques. The generalized detector comprises a stealthy scan/probe detector, a standard IDS and an anomaly detector. Each alert includes IP address information about the source and target of the malicious activity, and this information is used to correlate the information from each of the detectors.

The scan/probe detector generates an alert stream that may be presented to an analyst, used for generating reports (such as trend analysis), or correlated with alerts from other detectors.

The IDS may be a commercial product, such as ISS' RealSecure, Cisco's Netranger, or NFR's NIDS, or an open-source product such as SNORT or BRO. The IDS detection models may also be learned from a supervised training system, i.e., data-mining-based IDS, which is the subject matter of patent application Ser. Nos. 10/269,718 and 60/351,913. The anomaly detector is the subject of the above-identified patent application Ser. No. 10/269,694.

For scan/probe detection, the method of the invention comprises a) modeling network connections, b) detecting connections that are likely probes originating from malicious sources, and c) detecting scanning activity by grouping source addresses that are logically close to one another and by recognizing certain combinations of probes.

Once generated, the connection models are used by a detector to monitor online activity to detect malicious surveillance behavior without any requirement for a priori knowledge of system behavior.

In another aspect, the present invention correlates scanning and probing activities with alerts generated by the anomaly detector, and may also correlate with the alerts generated by the intrusion detection system (IDS).

Through correlation, the invention prioritizes alerts, reduces the number of alerts presented to the analyst, and determines the most important alerts. As a benefit, security personnel can attend to the most important threats first, and can greatly increase their productivity.

In addition to the foregoing aspects of the invention, the present invention also comprises a computer program product that utilizes a workbench concept. The workbench can integrate a variety of data sensors, as well as adaptive (knowledge-based) and deterministic (signature-based) detection techniques. The computer program product also provides a human interface for real time intrusion activity visualization and report generation.

Advantageously, the invention adapts to changes in the network and applications. This provides immunity to counter-tactics, i.e., engineering an attack to circumvent detection is rendered difficult. The invention can process large quantities of sensor data without unbounded memory requirements, and therefore is robust against stealthy attacks.

BRIEF DESCRIPTION OF THE DRAWINGS

These and other objects, features and advantages of the invention will be more readily apparent from the following Detailed Description of the Invention in which.

DETAILED DESCRIPTION OF THE INVENTION

Method

Figure 1:
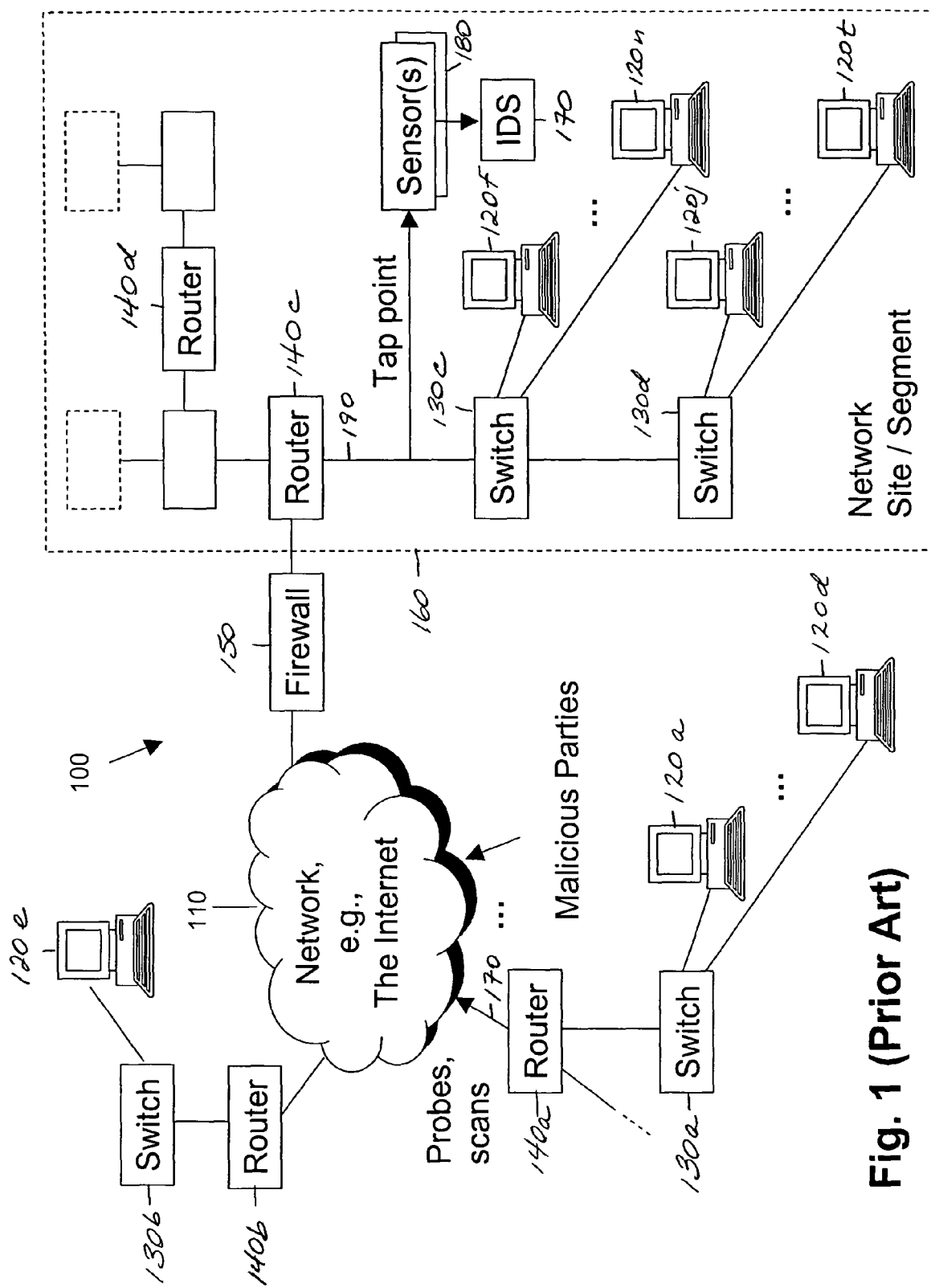
FIG. 1 is a schematic illustration of the Internet.
Figure 2:
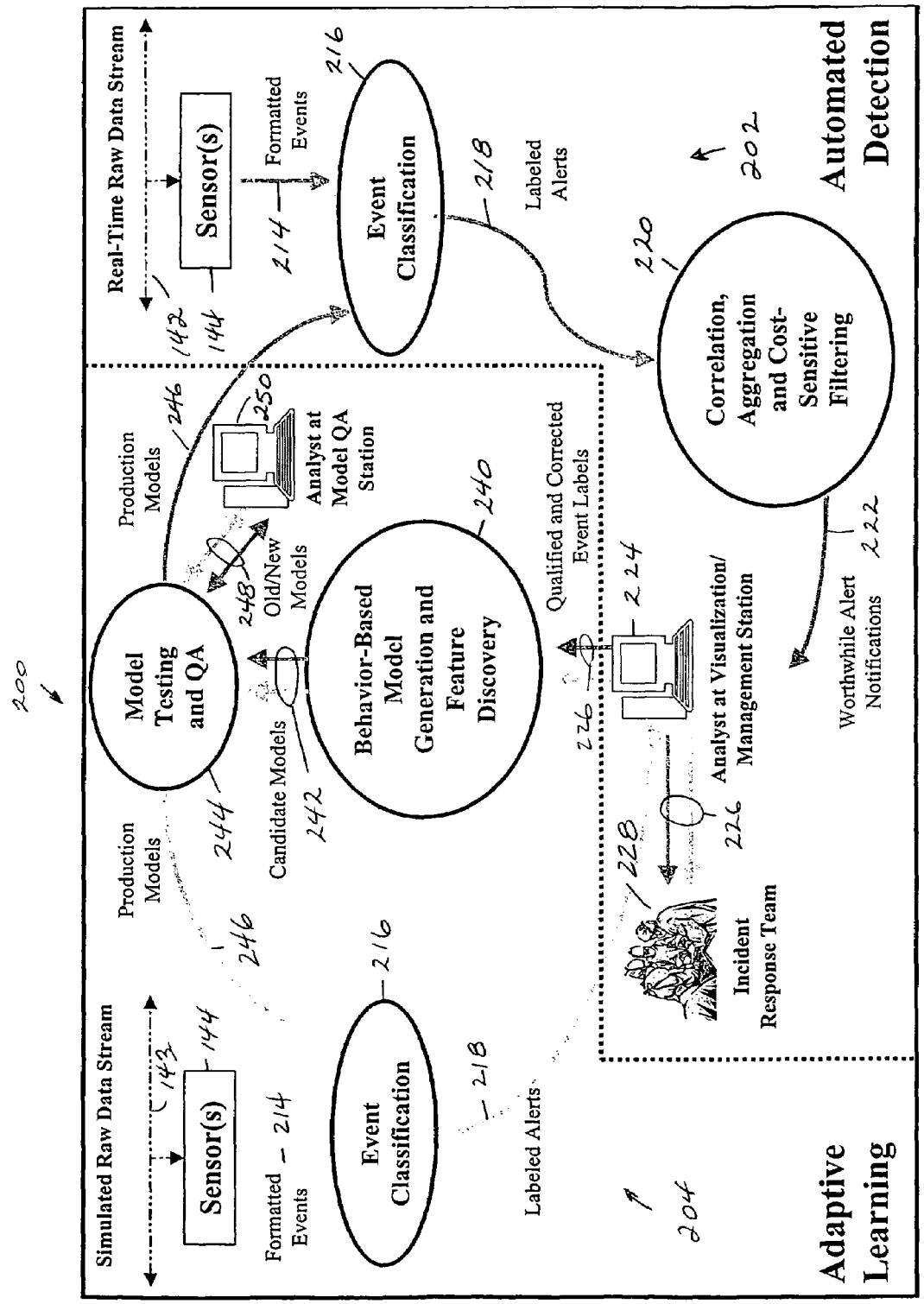
FIG. 2 is a schematic depiction of an illustrative embodiment of the automated detection and adaptive model learning methods of the present invention.

A preferred embodiment of the invention comprises two main processes utilizing three detectors: a scan probe detector, an intrusion detection system and an anomaly detector. As shown in FIG. 2, an automated scan/probe detection method 202 continually monitors network traffic and generates and presents alerts to analysts so that they may take preemptive or remedial action. The automatic detection method 202 comprises three main subcomponents: sensing 144, event classification 216 and filtering operations 220. In the sensing step, sensor(s) connect to one or more network tap points, and recognize and format significant events 214, e.g., IP connections. Event classification 216 receives events 214, detects surveillance activity, and outputs labeled alerts 218. The alert labels include information such as connection addresses and an invariant connection identifier. Event classification 216 utilizes one or more parameterized models, the parameters being determined either automatically or offline via an adaptive learning process 204.

Following event classification 216, a suite of parameter-based event filtering operations 220 reduces the alert information. Filtering operations 220 may include:

a. correlation, e.g., grouping source IP addresses that are considered sufficiently close to represent a common malicious entity;

b. aggregation, e.g., grouping multiple probing sources into a common scanning or attacking source;

c. cost-sensitive filtering, e.g., prioritizing alerts according to such criteria as severity of the attack, importance of the aspect of the network or data affected, and cost of preemptive action.

Filtering operations 220 utilize one or more parameterized models. Filtering operations 220 output worthwhile alert notifications 222 to workstation 224 for interpretation and response by a security team 228.

Event classification 216 and filtering operations 220 are amenable to either misuse or anomaly detection. To implement misuse detection, parameters are chosen to detect known malicious signatures. For anomaly detection, parameters are chosen to detect activity that is considered outside the boundaries of normal network operation.

In a preferred embodiment, automated scan/probe detection method 202 stores statistics on source IP addresses that initiate probes and scans over long periods of time. The Scan/Probe Detector maintains these statistics and IP addresses on a "watch list" of source IP scanners. After sufficient evidence (as determined by a user-selectable parameter) is gathered of a scanning activity, an "alert" is generated detailing this behavior. The alert is updated as new evidence is gathered. These alerts are provided to an analyst. They may also be "correlated" with other alerts generated by other detectors. "Correlation" means that the respective alerts are combined if they contain a "common IP address," either as a source or destination IP address.

The second main process of this aspect of the invention is known as adaptive learning 204 in FIG. 2. Adaptive learning makes use of knowledge from security audits performed by human analysts. Such audits generally involve analysis of correct positive detections, false positive detections, correct negative detections, and false negative detections. This process improves intrusion detection performance by automatically building improved detection models with, e.g., improved ability to accurately classify new intrusions. Event classification models 216 and filtering operations 220 are refined according to behavior-based model generation and feature discovery process 240, based upon generated worthwhile alert notifications 222 and archives of the data used to generate them. The output of step 240 comprises candidate models 242, which are further refined through testing and quality assurance (QA) step 244. Step 244 produces interim refined models 248 for evaluation by analysts using a workstation 250. After refinement is complete, production models 246 are available for use by automated detection process 202. Testing/QA step 244 may optionally function with simulated raw data 143, processed by offline versions of sensing step 144 and event classification 216.

These techniques may also be used in anomaly detection. Anomaly detection first builds a statistical model of normal network traffic and behavior. Anomaly detection next evaluates network activity with respect to this model and flags inconsistent activity as anomalous. Anomaly detection threshold levels are chosen to maximize the probability of correct detection while regulating the false-positive rate. The anomaly detection models are likewise incorporated in the event classification element 216.

Figure 3:
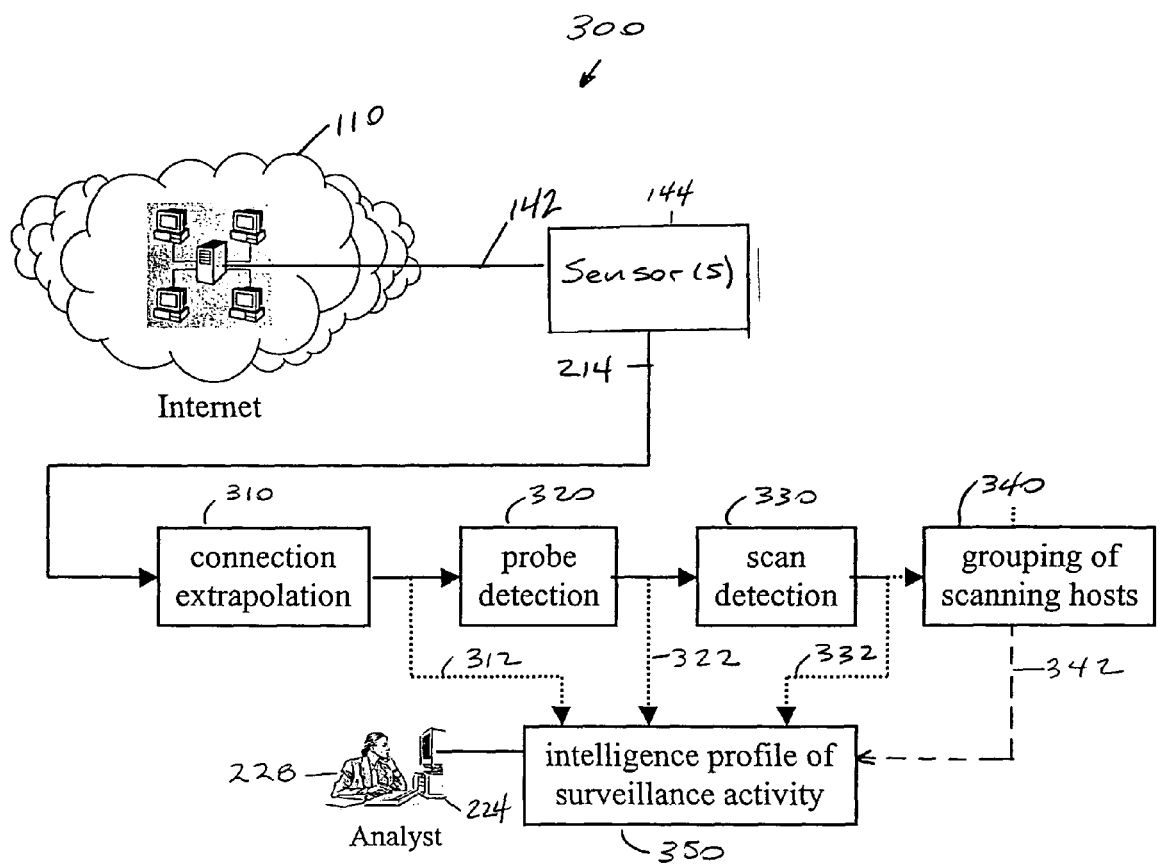
FIG. 3. is a schematic depiction of an automated detection process for surveillance detection of an illustrative embodiment of the invention.

FIG. 3 shows one embodiment of automated scan/probe detection method 202. As described above, sensing step 144 generates formatted events 214. These events are processed by connection extrapolation step 310 to generate extrapolated connection sessions 312. Connection extrapolation is necessary because absolute determination of connection sessions is not practical with finite traffic samples. Connection extrapolation comprises clustering packets exchanged between two IP addresses that a) are exchanged within a specified time period; b) have certain flags set; c) have similar flags set; or d) have similar characteristics.

Next, step 320 evaluates extrapolated connection sessions 312 with respect to content and size to detect surveillance probes 322 by:
 a. grouping connection session records over related source addresses;
 b. scoring each group based on the quantity of attack destinations; and
 c. generating an alert for each group whose score is greater than an empirically-derived threshold.

This functionality helps analysts discover multiple activities that are likely perpetrated by the same attacking entity by decreasing the number of alerts generated and improving the quality of the analysis.

Step 320 may optionally detect surveillance probes 322 by identifying packets:
 a. that are unusual;
 b. that have a particular arrangement of flags set;
 c. that have all flags set;
 d. that have payloads smaller than a predetermined size;
 e. to which there is no response;
 f. to which there is no response and that have a particular arrangement of flags set.

Step 320 may also optionally detect surveillance probes 322 by identifying detected connections with:
 a. certain characteristics;
 b. an unusually small number of packets;
 c. fewer packets than a predetermined limit;
 d. packets that have traveled only from the source to the destination; and
 e. packets that have traveled only from the destination to the source.

Step 330 receives detected surveillance probes 322 and detects surveillance scans 332:
 a. as a series of probes that originate from one or more source IP addresses and that are sent to one or more destination IP addresses;
 b. by identifying a particular source IP address that sends more than a specified number of probes;
 c. by identifying a particular source IP address that sends more than a specified number of probes within a specified time period;
 d. by identifying a particular source IP address that sends probes to more than a specified number of destinations;
 e. by identifying a particular source IP address that sends probes to a specified set of destinations;
 f. by identifying a particular source IP address that sends probes to specified ports; and
 g. by identifying a particular source IP address that sends probes to a number of destinations that exceed a specified limit within a specified time period.

Scan detection step 330 may also limit the number of detected scans by reporting only source IP addresses that perform more than a specified number of probes within a specified time or by reporting only source address groups that perform more than a specified number of probes within a specified time.

Step 340 receives detected scans 332 and aggregates scanning hosts distributed across a series of IP addresses. This step subtracts one IP address from another and places the two addresses in the same group if the difference is less than a specified amount.

Steps 310, 330 and 340 utilize parameters to optimize the false positive detection rate versus the true positive rate. If a higher probability of correctly identifying actual malicious parties is desired, the consequence of incorrectly identifying more non-malicious users as malicious normally will be suffered. For example, step 330 may detect a scan by, among other criteria, identifying a particular source IP address that sends more than a specified number of probes within a specified time period. As the specified number of probes is reduced and/or the specified time period is increased, the probability of correctly identifying an actual malicious party increases, but the probability of incorrectly identifying a non-malicious party as malicious also increases.

In addition, step 340 uses parameters to optimize grouping of alerts to control the number of items presented to the analyst. Grouping also enables detection of scanners that attempt to hide scanning activity by using multiple IP addresses. As the specified address range increases, fewer groups having larger populations will be reported. As a benefit, long-term, "stealthy" surveillance can be detected with minimal memory, since the grouping reduces the amount of information that would otherwise need to be maintained over time. The consequence of larger group size is reduced resolution of detected malicious sources.

A profile of surveillance activity may be generated at step 350 based on outputs 312, 322, 332 and 342. The profile comprises one or more of the following measures and statistics:
 a. a breakdown of probes, e.g., source address, destination address, number of probes emitted, time emitted etc.;
 b. a breakdown of scans, e.g., information regarding constituent probes and non-probe activity initiated by the scan originator;
 c. the number of attacks per unit time;
 d. the number of attackers;
 e. the percentage of activity that constitutes malicious surveillance;
 f. the breakdown of source country frequencies;
 g. the most frequently-targeted network addresses; and
 h. the temporal frequency trends of individual attackers.

Such an intelligence profile is very useful to analysts. By considering the above information, analysts can quickly prioritize a large number of surveillance alerts, characterize malicious activity and specify appropriate action.

In an alternate embodiment, automated probe and scan detection 202 detects long-term/stealthy surveillance in high-bandwidth environments with high reliability and low false-positive rate. This embodiment requires minimal memory resources and provides an attack grouping that simplifies the task of the security analysts. It comprises the following steps:
 a. extrapolating connection sessions between source/destination address pairs;
 b. identifying each extrapolated session that is unidirectional to be a probe (since in the majority of legitimate cases, the source address would have known the particular destination address was illegitimate or non-operational);
 c. scoring each corresponding source based on the quantity of probes it emitted;
 d. considering such a source to be an attacker if its score is greater than an empirically-derived threshold;
 e. grouping multiple attackers that are sufficiently close in address space (since they may be considered to represent a common malicious effort).

The embodiments of automated detection discussed above enable model parameters to be tuned according to local network characteristics and analysts' preferences. For example, in high-bandwidth environments, or when the cost of false alarms is very high, thresholds may be set at higher levels so as to generate only higher-priority alerts.

According to this aspect of the invention, connection information is translated into an invariant connection identifier. For TCP/UDP, this identifier reflects protocol, IP source address, transport source address, IP destination address, and transport destination address. The invariant connection identifiers reference a database that includes usage timestamps and flags. Periodically, the database is checked, and inactive connections are timed out.

The invariant identifier is used to optimize connection extrapolation 310. Otherwise, redundant identifiers might be generated. For example:

| Packet Source IP Address | Packet Destination IP Address | Packet Protocol | Packet Source Port | Packet Destination Port |
|---|---|---|---|---|
| 1.1.1.1 | 2.2.2.2 | TCP | 111 | 222 |
| 2.2.2.2 | 1.1.1.1 | TCP | 222 | 111 |

Address <1.1.1.1,2.2.2.2,TCP,111,222> would need to be matched with <2.2.2.2,1.1.1.1,TCP,222,111> in order to recognize that they represented the same connection. Instead the addresses are associated with same identifier for this connection no matter if address 1.1.1.1 sends the packet or address 2.2.2.2 sends the packet. Flags fields in the connection extrapolator thereafter record from which direction interesting events (i.e., first packet, etc.) initiate.

Figure 4:
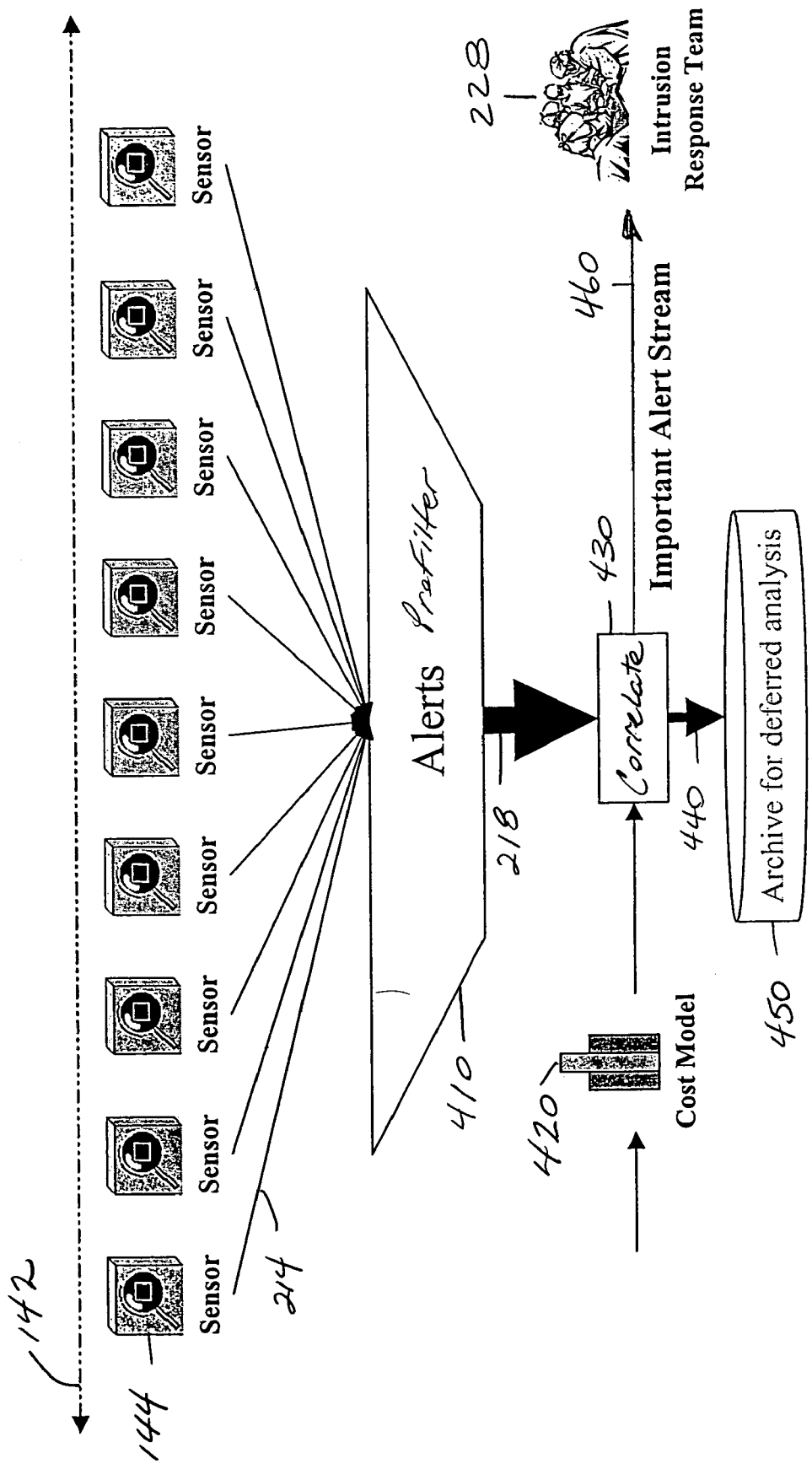
FIG. 4 is a schematic depiction of a filtering and correlation process of an illustrative embodiment of the invention.

FIG. 4 shows an embodiment of cost-based filtering of alerts to prioritize important alerts in order to simplify security analysts' tasks. Output from sensing step 144 are processed by alert prefilter 410 to remove redundancy. The prefiltered alerts 218 are further processed by correlation filter 430 according to cost model 420. This cost model prioritizes alerts according to such criteria as severity of the attack, importance of the network components or data affected, and the cost of preemtive action. The important alert stream 460 is delivered to the intrusion response team 228.

Figure 5:
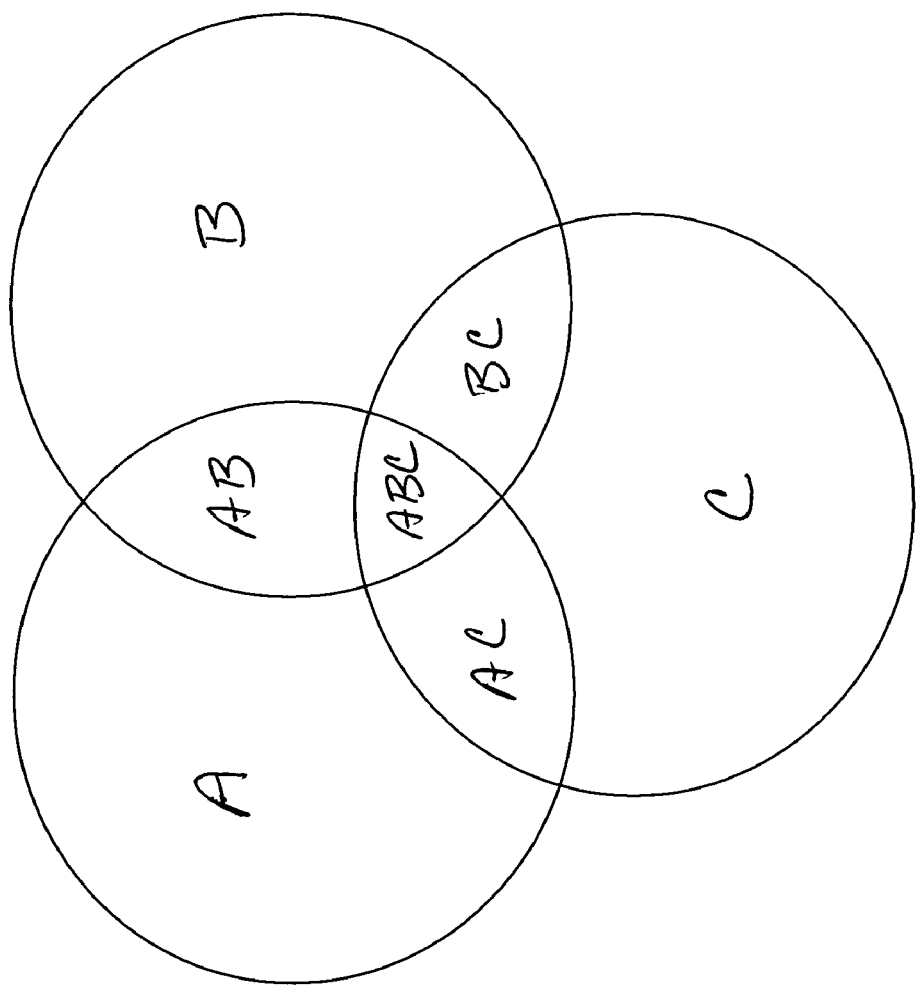
FIG. 5 is a Venn diagram useful in understanding the relationship between the scan/probe detector, intrusion detector and anomaly detector.

The overall method of the invention receives disparate alerts generated by the three main components, scan and probe detection, IDS/adaptive learning and anomaly detection, and correlates these alerts to synthesize and prioritize overall alerts. These three sources of alerts are represented by regions A, B and C, respectively, in the Venn diagram of FIG. 5. The invention prioritizes and reduces the number of alerts presented to an analyst. Alert correlation may be understood with reference to the following cases depicted in FIG. 5 in which a particular IP address has generated:

A—probe/scan detector alerts only;
AC—probe/scan alerts as well as anomalous network activity alerts;
ABC—probe/scan alerts, IDS alerts, and anomalous network behavior alerts;
C—anomalous network alerts only;
AB—probe/scan alerts as well as IDS alerts;
BC—IDS alerts as well as anomalous behavior alerts;
B—IDS alerts only.

Priorities may be assigned to each case by the security analyst. For example, category AC alerts are very important. These represent the case where probe/scan alerts as well as anomalous behavior alerts but no IDS alerts were generated for the source IP address. As such, they represent a high probability of new malicious behavior that has not been detected by the more conventional IDS methodology.

Computer Program Product

Figure 6:
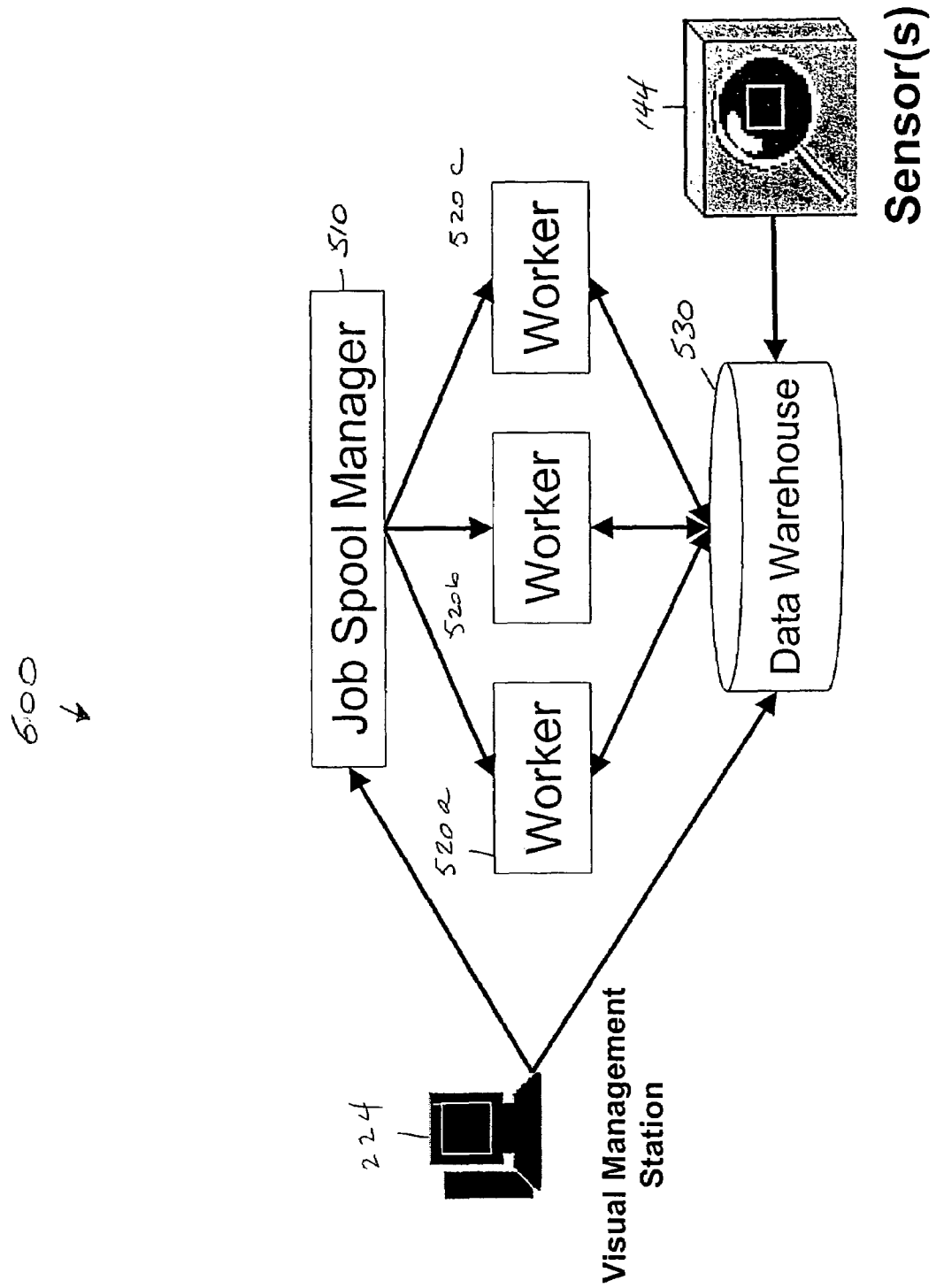
FIG. 6 is a schematic depiction of a computer program product of the invention.

FIG. 6 depicts a computer program product that implements the method of the invention. The computer program product embodies a "workbench" concept. This enables flexibility to "plug in" a variety of functional modules, or "workers" 520. Job spool manager 510 orchestrates the operation of the workers, which in turn receive data from and supply data to a database, or "data warehouse" 530. This configuration is convenient to implement a pipeline data processing functionality. The data warehouse may be realized as any of a variety of practical databases, and may also receive data from sensing step 144 and management workstation 224. The data warehouse may also store archived network data and detection models and filter suites. Worker modules may deposit alerts and anomalous activity reports into the data warehouse for further analysis and archiving. This information serves adaptive learning process 204.

Workstation 224 may be used by analysts to configure and manage all components and operation of the computer program product, including automatic detection and adaptive learning. This facilitates visualization of raw data and alerts; it also enables analysts to improve learned models and evaluate their performance in a testing environment before field use.

Figure 7:
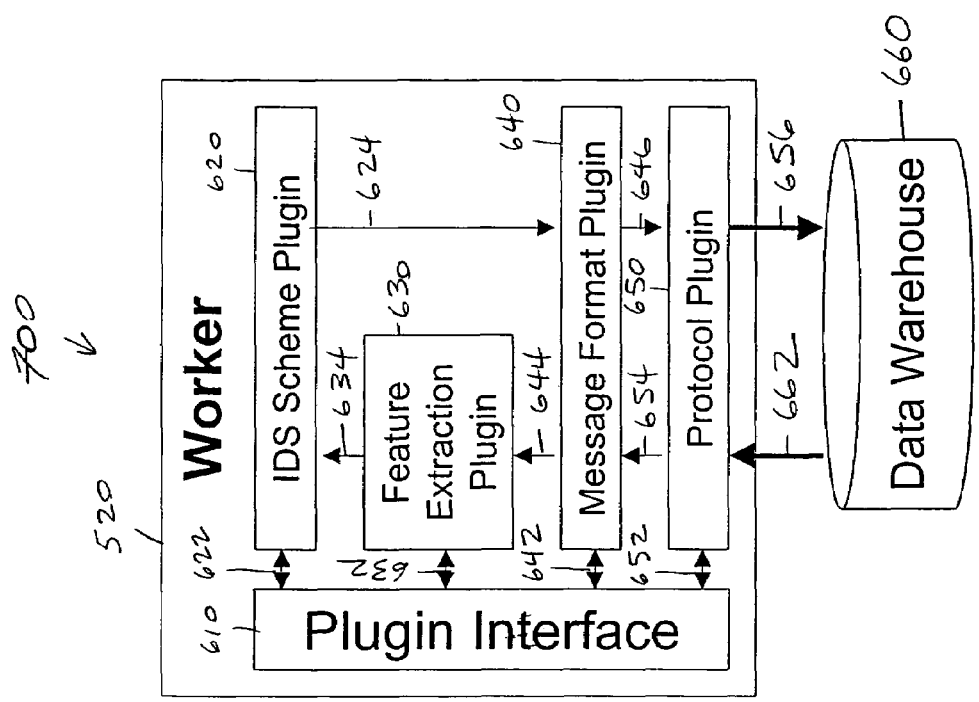
FIG. 7 is a schematic depiction of an illustrative embodiment of a module of the computer program product of FIG. 6.

FIG. 7 is a schematic of a functional module, or "worker" 520. Protocol plugin 650 receives data from data warehouse 660 and strips off protocol information to yield the underlying message information 654. Message format plugin 640 in turn interprets the message information, while feature extraction plugin 630 detects specific components of a message. IDS scheme plugin 620 may be used to recognize various components of an attack, e.g., probes and scans. Plugin interface 610 orchestrates the interoperation of the aforementioned plugins.

Figure 8:
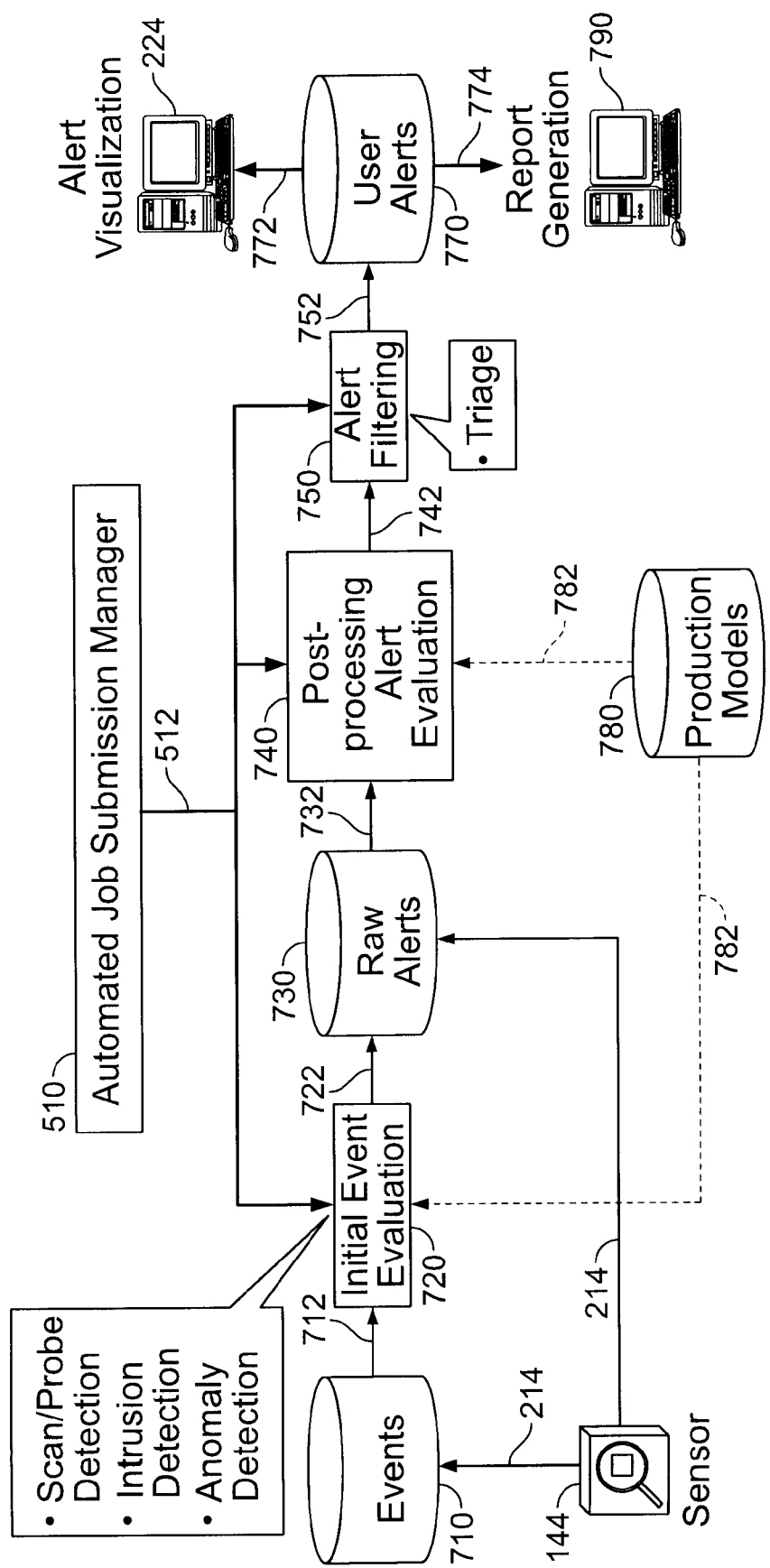
FIG. 8 is a schematic depiction of an illustrative embodiment of the computer program of FIG. 6.

FIG. 8 shows a specific embodiment of computer program product 600 of FIG. 6. Sensing step 144 supplies event information 214, which may be temporarily stored in buffer 710 and output on path 712. Worker 720 utilizes production models stored in memory 780 to perform initial event evaluation, yielding raw alerts 722. The raw alerts may be temporarily stored in buffer 730. Worker 740 processes raw alerts to detect probes and/or scans or to produce other alerts. Parameters for this worker may also be stored in memory 780. Filter 750 applies a cost-based filter to further process alerts 742. Output 752 may be stored in buffer 770, and subsequently processed by visualization station 224 or report generation station 790. Job submission/spool manager 510 orchestrates the operation of the aforementioned elements.

The computer program product is stored in the memory of a computer system, e.g., a workstation or personal computer, to format, classify and analyze surveillance probes and scans, known attack alerts, and anomalous network event alerts. The computer system comprises a central processing unit and a memory coupled to the central processing unit. In addition to the computer program product of the present invention, the memory also stores:

a. outputs of sensors,
b. outputs of alert filtering modules,
c. outputs of the initial event evaluator, and
d. outputs of the post-processing alert evaluator.

Figure 9:
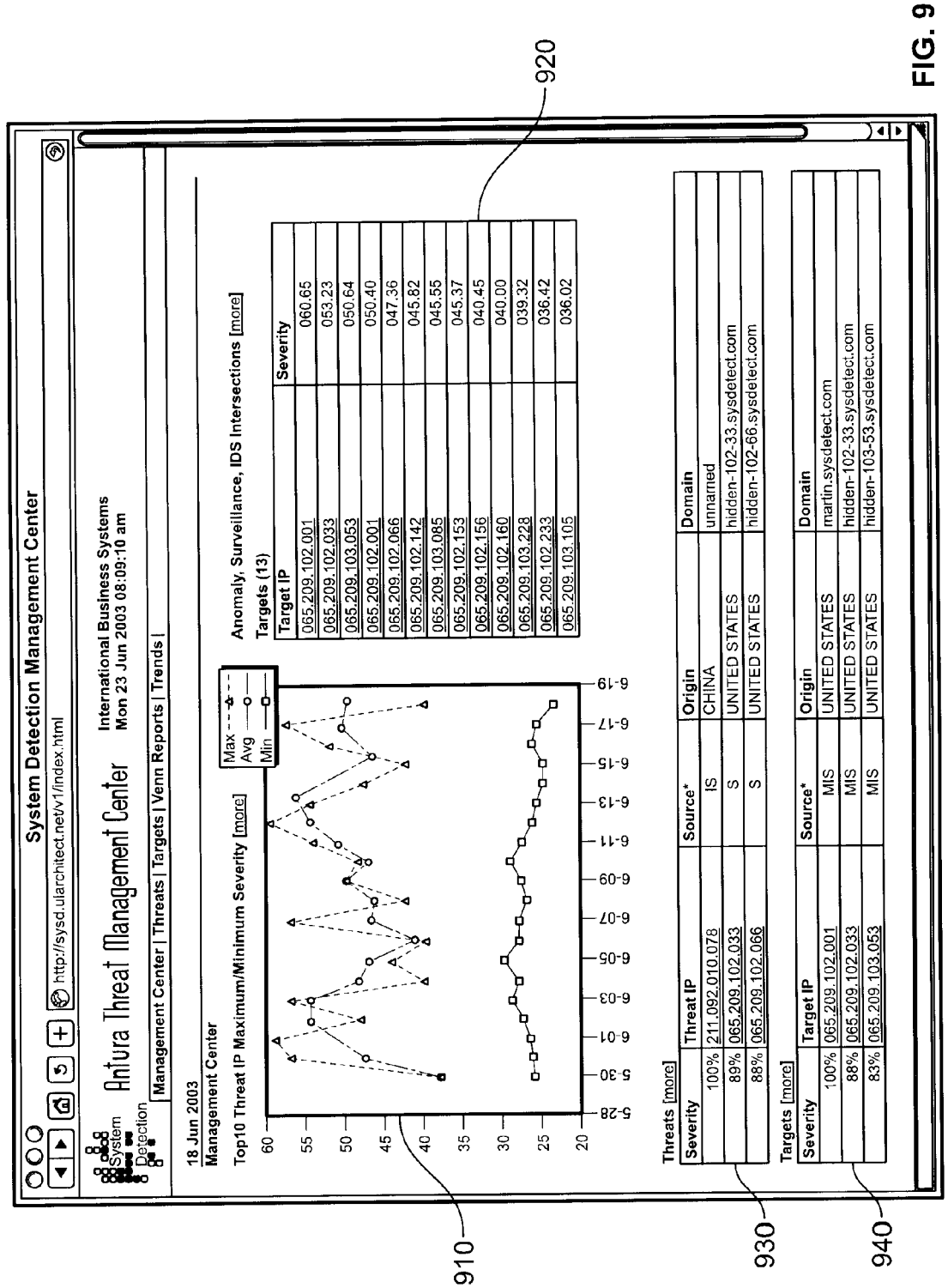
FIG. 9 is a schematic illustration of a display screen used in an embodiment of the invention.

FIG. 9 depicts a display screen in an illustrative embodiment of a user interface used in the practice of the invention. The screen includes four displays: a display 910 of the activity of the top ten threats, a display 920 of the top targets as identified by all three probe/scan, IDS and anomaly detectors, a display 930 of further details about selected threats and a display 940 of further details about selected targets. As indicated in FIG. 9, display 910 provides a plot of attack severity level with time. As shown in FIG. 9, the time period is three weeks but other time periods may be selected by the system user. Likewise, attack severity may be plotted and displayed for individual attackers or individual targets or for groups of attackers or groups of targets as selected by the system user. Display 910 has the advantage of making trends readily apparent at a glance at the display. Display 920 provides the IP address of the target and an estimate of the severity of the attack in the form of a numerical score. Advantageously, the score is the score computed by step 320. Displays 930 and 940 proved additional information in the form of an indication of the country, domain and source of the attacker and target, respectively. As depicted in FIG. 9, this display shows further details about the most severe attackers and most severely attacked targets, but these displays can be scrolled to provide more information about less severe events as well.

Evaluation

The surveillance detector component of the invention was applied to a large enclave computer network over a period of 72 hours. The sensor used observed 344 million packets, including 24 Gigabytes of headers. The average data rate was 0.7 megabytes per second (MBPS), with peak rates of 3.3 MBPS, measured over one second intervals. 500K IP addresses were observed. 11.5 million estimated connections were extrapolated, of which 28% were detected as probes according to the methods described above.

The results of the evaluation facilitated the selection and optimization of various thresholds and other parameters pertinent to the method of the invention. In general, detection threshold optimization is critical, since an overly high threshold may cause an important alert to be suppressed, while a low threshold may result in an overwhelming number of generated alerts, and/or may increase the number of false positive alerts. In addition to threshold optimization, the evaluation provided insight into grouping of alerts. As stated, this reduces the amount of information presented to the analyst, and may provide a more meaningful summary without suppressing important alerts.

Figure 10:
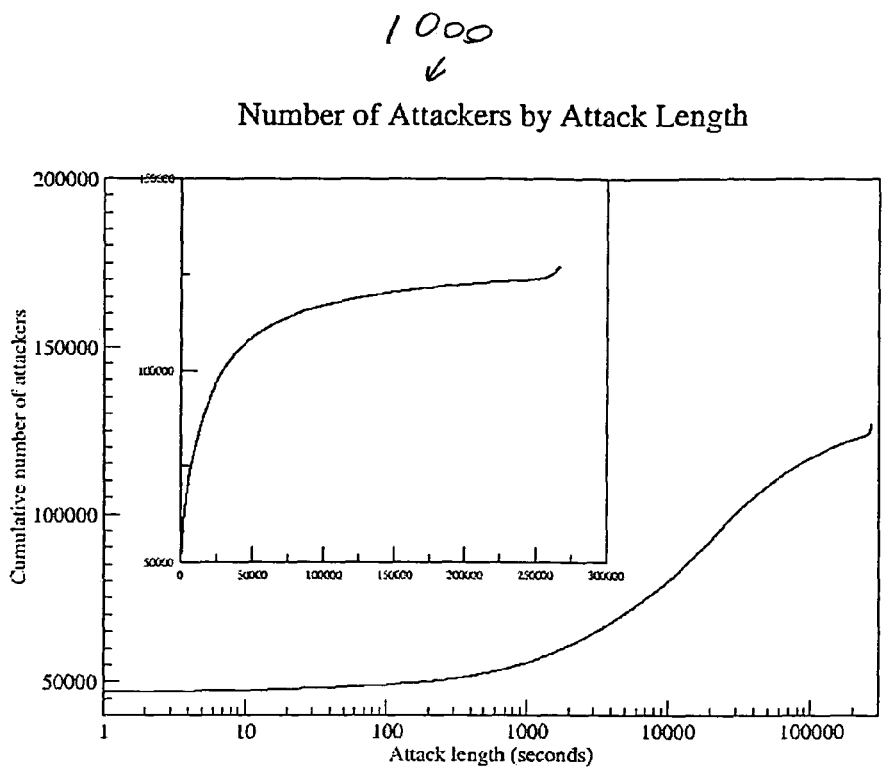
FIGS. 10-16 depict performance statistics related to an application of the invention in monitoring surveillance attacks on a large computer network.

FIG. 10 shows Number of Attackers by Attack Length (cumulative). Only probing addresses for which the time span between first and last probes is less than or equal to the values given on the horizontal axis are considered attackers. Note that the majority of attackers scan for 100K seconds or less. The evaluation data revealed that 48 percent of attackers scanned for more than one hour, and 39% of attackers scanned for more than one day.

Figure 11:
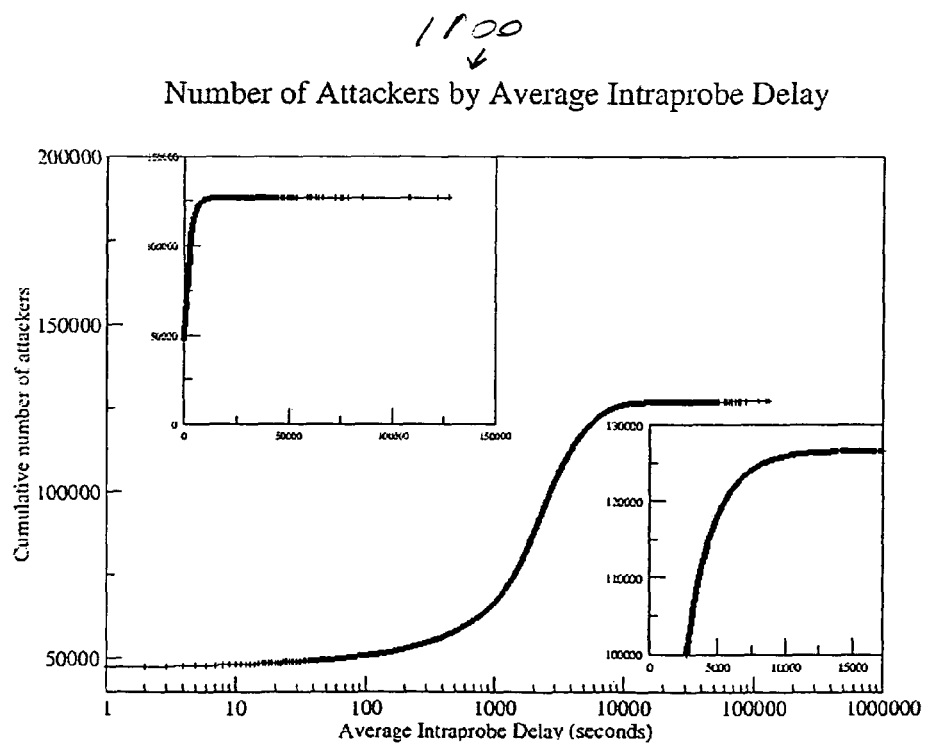

FIG. 11 shows Number of Attackers by Average Intraprobe Delay (cumulative). Only probing addresses for which the average amount of time between probes is less than or equal to the values indicated along the horizontal axis are considered attackers. The majority of attackers have an average delay of 5K seconds or less; in other words, only a small number of attackers utilize "stealthier" scanning. The evaluation data revealed that 14% of attackers exhibited a delay of more than one hour between packets, 3% of attackers exhibited a delay of more than two hours between packets, and 0.3% exhibited a delay of more than four hours.

Figure 12:
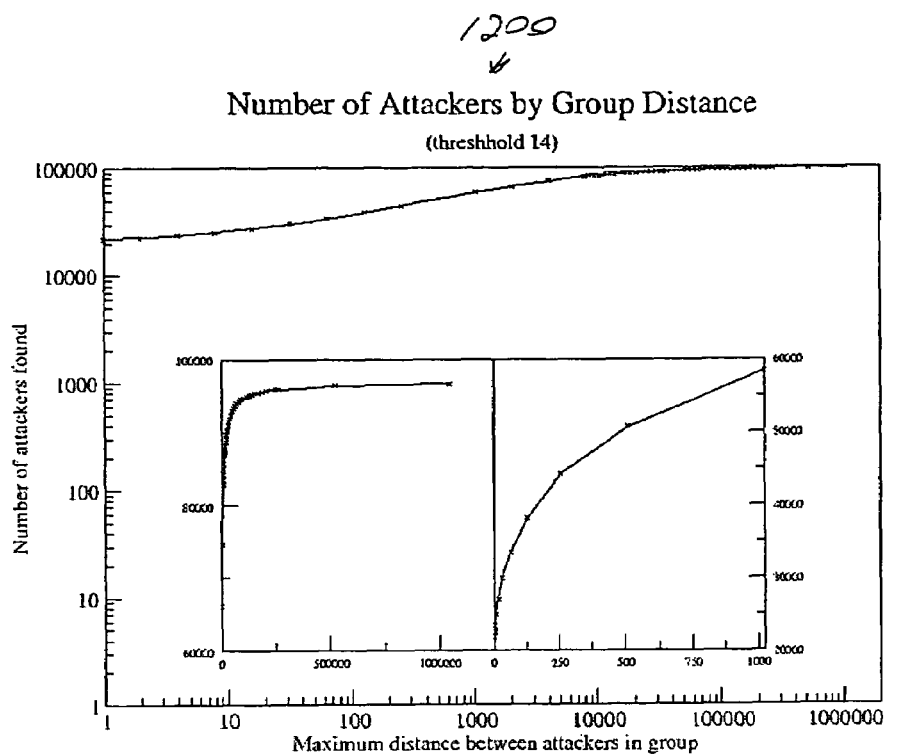

FIG. 12 shows the Number of Attackers by Group Distance (cumulative), i.e., the number of attackers vs. maximum group distance. The latter characterizes how close probing addresses must be (in address space) to be considered part of the same surveillance effort. For a given group distance, any corresponding group that performed more than 14 probes was considered a set of attackers, i.e., a common surveillance effort. The vertical axis measures the number of probing (i.e., attacking) addresses across all groups found. As the group distance increases, probing attackers are quickly accounted for.

Figure 13:
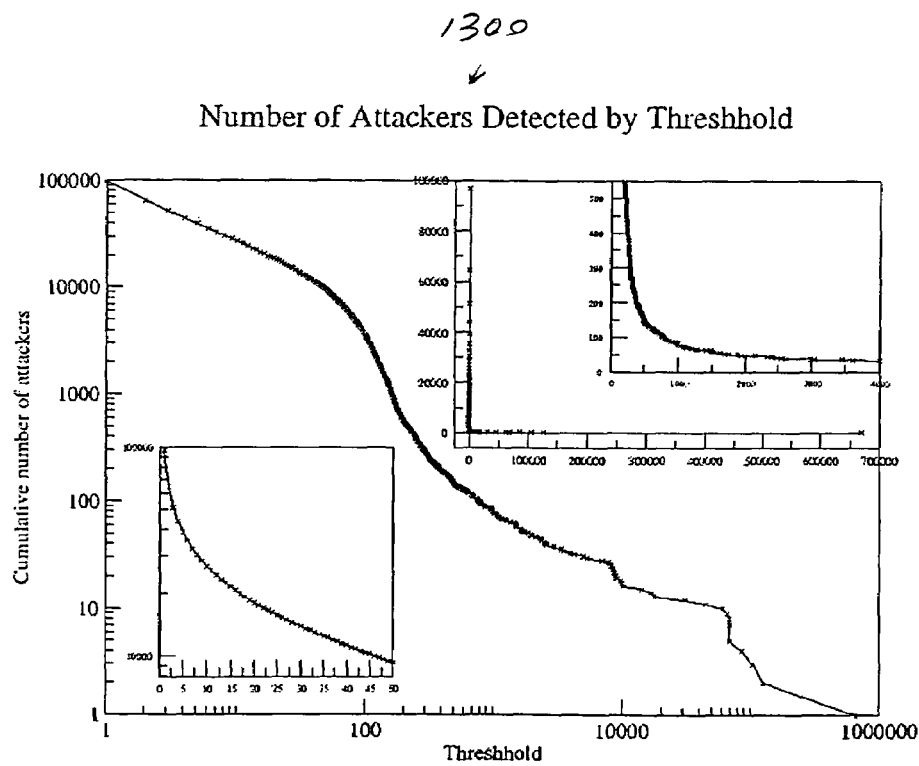

FIG. 13 shows Number of Attackers Detected by Threshold. The four graphs represent the number of source addresses considered to have performed a scan vs. an alert threshold given on the horizontal axis. The alert threshold represents the number of probing activities necessary to be considered a scan. For example, for a threshold setting of 1000, approximately 70 source addresses triggered an alert, i.e., 70 attackers were detected. The dramatic dropoff in the low range of the curve shows that most addresses that emit probes do so at most a small number of times, and so relatively low threshold settings may eliminate the reporting of nearly all of the infrequent probers. This may be explained by the "backscatter" phenomena, whereby addresses that appear to probe with relatively low frequency are often responding to other scans, or are otherwise unimportant in that their scans are most likely not targeting the enclave that the invention is protecting.

The lower-left inset emphasizes the area where thresholds may typically be set (e.g., 0-5-range), and reveals a knee for detected attackers starting in the 20-25 range. The rightmost portion of the logarithmic (main) curve reveals two additional inflection points. One explanation for this behavior is that it may be unusual for an address to exceed the corresponding probing speed due to network capability or configuration limitations.

Figure 14:
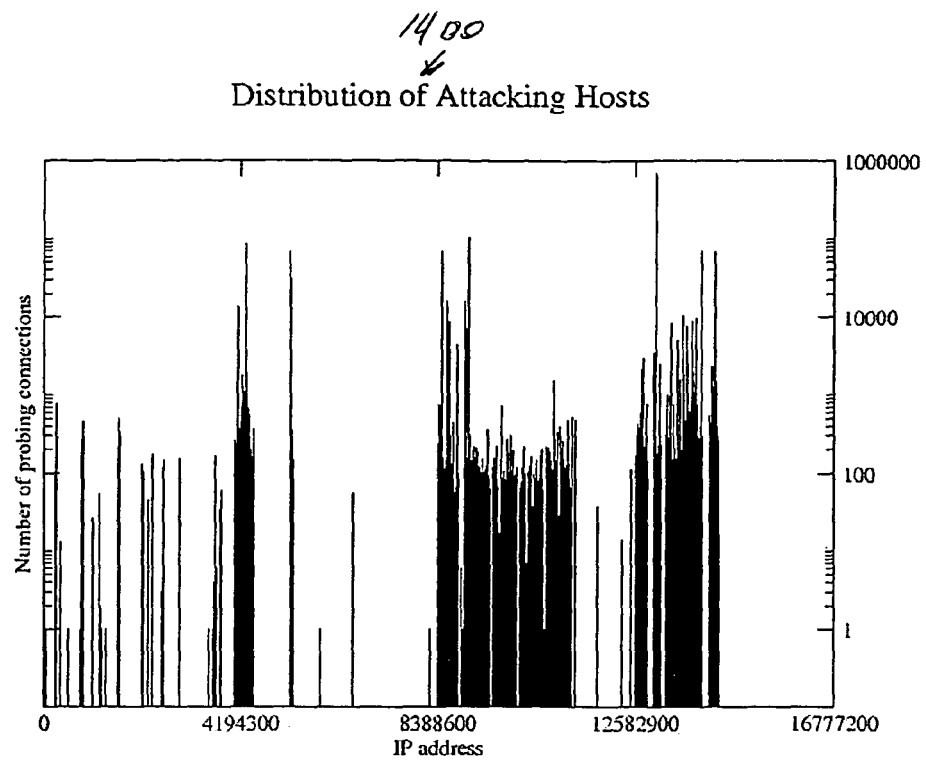
Figure 15:
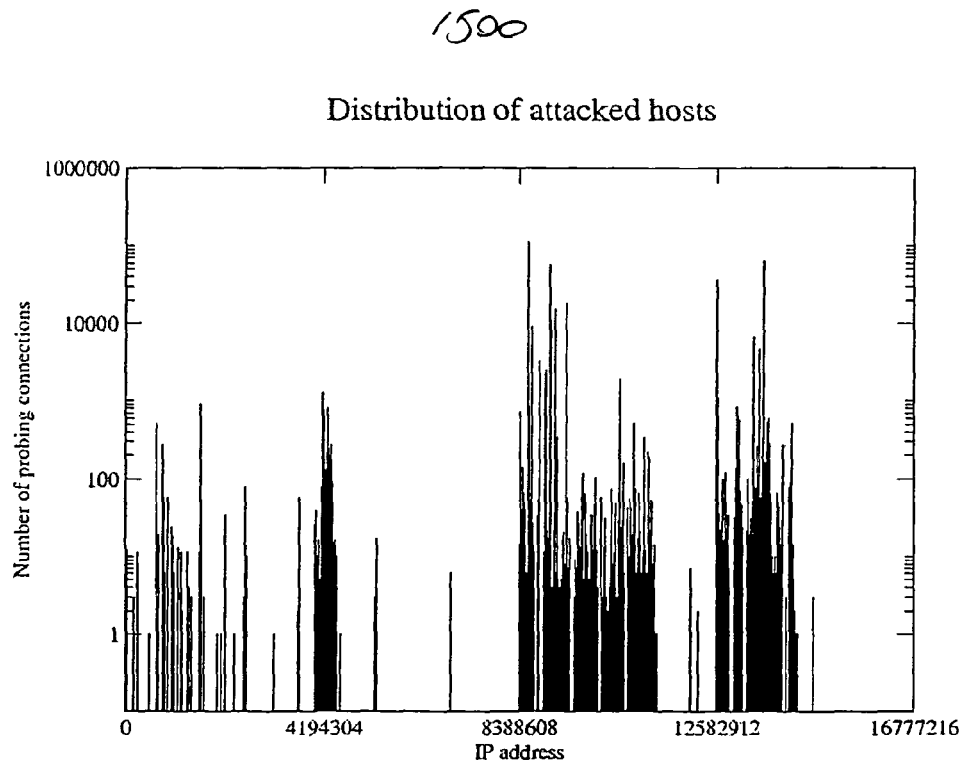

FIGS. 14-15 show the Distributions of Attacking/Attacked hosts, respectively. These complementary characteristics show that there are fewer attacked addresses than attacking addresses, and that attacking addresses each attack more frequently than each attacked host is attacked.

Figure 16:
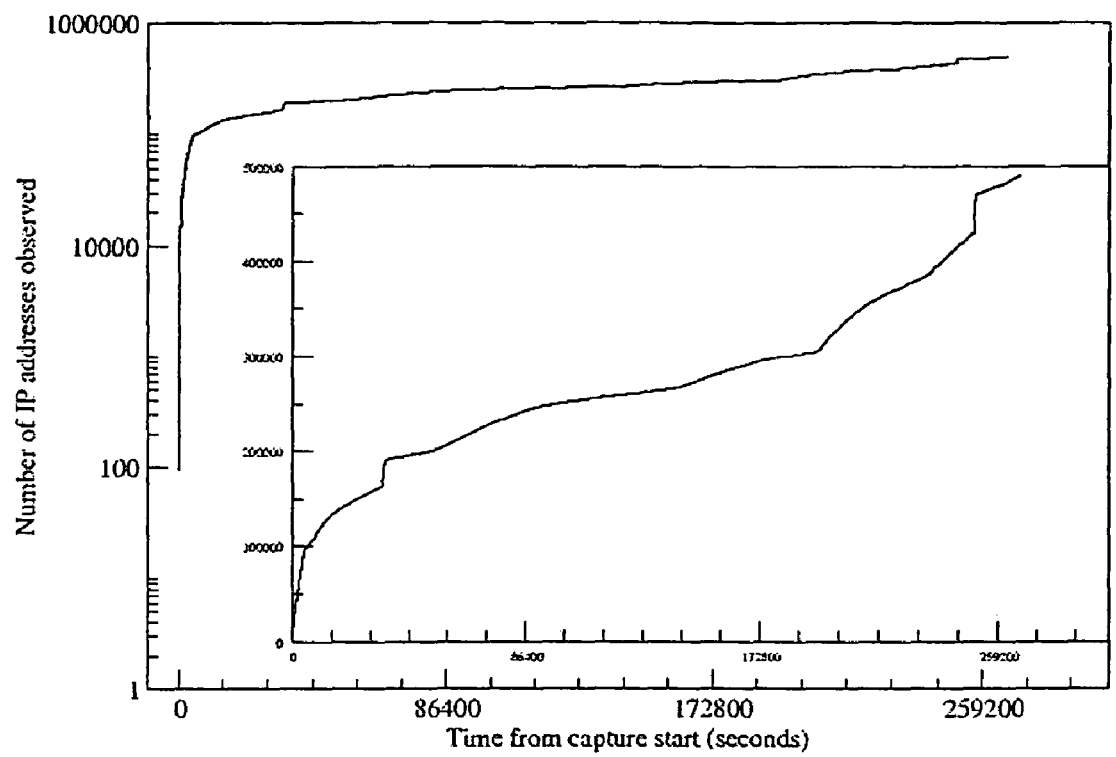

FIG. 16 shows the number of IP addresses observed vs. time: after 72 hours, nearly 500K addresses were observed.

ADVANTAGES OF THE INVENTION

The invention improves the productivity of computer network security analysts and the security of the networks protected. The invention accomplishes this by prioritizing and combining a large number of security alerts generated by three disparate methods of malicious activity detection. As another benefit, security personnel can limit their attention to the most important threats, avoid distraction by inconsequential alerts, and can greatly increase their productivity.

The machine learning techniques embodied in the invention allow the intrusion detection techniques to adapt to changes in the network and applications. This provides agility to counter tactics of malicious parties, i.e., engineering an attack to circumvent detection is rendered difficult.

The invention is able to process large quantities of sensor data without unbounded memory requirements; it is therefore robust against stealthy/perceptive scans.

The invention may be applied to a broad range of threats, including intrusion, fraud and virus detection, both externally- and internally-perpetrated.

The invention is applicable to a broad variety of network configurations through parameter tuning, e.g., to network enclaves or peering centers.

The invention is amenable to real-time, on-line use, with operator monitoring and intervention; it is amenable to a variety of tap points, e.g., host and LAN packet feeds, peering-centers, enterprise enclaves, email servers. The invention is compatible with many applications/events, e.g., connection or packet data, email data, firewall logs.

The computer program product utilizes a generalized, modular framework that can integrate adaptive (knowledge-based) and deterministic (signature-based) detection techniques, as well as visualization and report generation. It is amenable to a variety of sensors and mining and analysis modules.

The modular nature of the computer program product supports the dynamic addition of processing modules and enables integration of existing modules. Models may be tested and refined offline for productization.

Computational resources (hardware and software) for detection and analysis may be distributed over the network, and threat information from multiple vantage points may be correlated and analyzed The foregoing description, for purposes of explanation, used specific nomenclature to provide a thorough understanding of the invention. However, it will be apparent to one skilled in the art that the specific details are not required in order to practice the invention. In other instances, well known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, and many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of detecting surveillance probes on a computer communications network, comprising:
    receiving a plurality of messages from a data sensor located at a network audit point, said data sensor sampling data packets on said computer communications network and outputting said messages, each of said messages describing an event occurring on said communications network;
    processing said messages to form extrapolated connection sessions from said sampled data packets from which to determine a connection source that initiated the connection session by clustering packets exchanged in respective directions over a connection between addresses associated with a connection identifier for said connection said addresses including an address of said connection source and a destination address, and clustering packets that are a) within a specified time period where the source and destination addresses are not predetermined, (b) have certain flags set, or c) have source and destination addresses that are not predetermined but have similar characteristics; and
    detecting a surveillance probe by:
        grouping said connection sessions into a plurality of groups of related connection source addresses;
        scoring each group based on at least a quantity of attack destinations; and
        generating an alert for each group whose score is greater than an empirically derived threshold.

2. The method of claim 1, further comprising controlling false positive detections of a surveillance probe vs. false negative detections of a surveillance probe.

3. The method of claim 1, further comprising generating a profile of surveillance activity, said profile of surveillance activity comprising one or more of the following:
    a breakdown of probes;
    a number of attackers;
    a number of attacks per unit time;
    a percentage of activity that constitutes malicious surveillance;
    a breakdown of source country frequencies;
    the most frequently-targeted network addresses; and
    temporal frequency trends of individual attackers.

4. The method of claim 1, further comprising processing one or more of said detected surveillance probes to produce a detected surveillance scan, said processing of one or more of said detected surveillance probes to produce a detected surveillance scan comprising one or more of the following:
    modeling and detecting surveillance scans as a series of surveillance probes that originate from one or more source addresses and that are sent to one or more destination addresses;
    modeling and detecting surveillance scans performed by a particular source address by identifying a particular source address that sends more than a specified number of probes;
    modeling and detecting surveillance scans performed by a particular source address by identifying a source address that generates more than a specified number of probes within a specified time period;
    modeling and detecting surveillance scans performed by one source IP address by identifying a source address that sends probes to more than a specified number of destinations;
    modeling and detecting surveillance scans performed by a particular source address by identifying a source address that sends probes to a specified set of destinations;
    modeling and detecting surveillance scans performed by a particular source address by identifying a source address that sends probes to specified ports; and
    modeling and detecting surveillance scans performed by a particular source address by identifying a source address that sends probes to a number of destinations in excess of a specified limit within a specified time period.

5. The method of claim 4, further comprising controlling false positive detections of a surveillance probe vs. false negative detections of a surveillance probe.

6. The method of claim 4, further comprising generating a profile of surveillance activity, said profile of surveillance activity comprising one or more of the following:
    a breakdown of probes;
    a breakdown of scans;
    a number of attackers;
    a number of attacks per unit time;
    a percentage of activity that constitutes malicious surveillance;
    a breakdown of source country frequencies;
    the most frequently-targeted network addresses; and
    temporal frequency trends of individual attackers.

7. The method of claim 4, further comprising processing one or more of said detected surveillance scans to detect a group of scanning hosts, said processing of one or more of said detected surveillance scans to detect a group of scanning hosts comprising:
    modeling and detecting scans distributed across a series of source addresses by grouping addresses, said grouping of addresses being performed by subtracting one address from another and placing the two addresses in the same group if the difference is less than a specified amount.

8. The method of claim 7, further comprising controlling false positive detections of a surveillance probe vs. false negative detections of a surveillance probe.

9. The method of claim 7, further comprising generating a profile of surveillance activity, said profile of surveillance activity comprising one or more of the following:
 a breakdown of probes;
 a breakdown of scans;
 a number of attackers;
 a number of attacks per unit time;
 a percentage of activity that constitutes malicious surveillance;
 a breakdown of source country frequencies;
 the most frequently-targeted network addresses; and
 temporal frequency trends of individual attackers.

10. The method of claim 4 further comprising the steps of:
 limiting the number of detected scans by reporting only source addresses that perform more than a specified number of probes within a specified time; and
 limiting the number of detected scans by reporting only source address groups that perform more than a specified number of probes within a specified time.

11. The method of claim 1 wherein the steps of processing said messages to form extrapolated connection sessions and detecting a surveillance probe further comprises at least one of the following steps:
 identifying packets that have a particular arrangement of flags set;
 identifying packets that have all flags set;
 identifying packets that have payloads smaller than a predetermined size;
 identifying packets to which there is no response.

12. The method of claim 1 wherein the steps of processing said messages to form extrapolated connection sessions and detecting a surveillance probe further comprises at least one of the following steps:
 identifying detected connections with fewer packets than a predetermined limit;
 identifying detected connections with packets that have traveled only from a source to a destination;
 identifying detected connections with packets that have traveled only from the destination to the source; and
 identifying detected connections with packets whose payloads are smaller than a predetermined limit.

13. A system for detecting surveillance probes on a computer communications network, comprising:
 a data sensor located at a network audit point adapted to sample data packets on said computer communications network and to output messages, each of said messages describing an event occurring on said communications network; and
 a processor that processes said messages to form extrapolated connection sessions from said sampled data packets from which to determine a connection source that initiated the connection session by clustering packets exchanged in respective directions over a connection between addresses associated with a connection identifier for said connection, said addresses including an address of said connection source and a destination address, and clustering packets that are a) within a specified time period where the source and destination addresses are not predetermined, (b) have certain flags set, or c) having have source and destination addresses that are not predetermined but have similar characteristics, and that detects a surveillance probe by grouping said connection sessions into a plurality of groups of related connection source addresses, scoring each group based on at least a quantity of attack destinations, and generating an alert for each group whose score is greater than an empirically derived threshold.

14. The system of claim 13, wherein said processor further generates a profile of surveillance activity comprising one or more of the following:
 a breakdown of probes;
 a number of attackers;
 a number of attacks per unit time;
 a percentage of activity that constitutes malicious surveillance;
 a breakdown of source country frequencies;
 the most frequently-targeted network addresses; and
 temporal frequency trends of individual attackers.

15. The system of claim 13, wherein said processor further processes one or more of said detected surveillance probes to produce a detected surveillance scan by performing one or more of the following steps:
 modeling and detecting surveillance scans as a series of surveillance probes that originate from one or more source addresses and that are sent to one or more destination addresses;
 modeling and detecting surveillance scans performed by a particular source address by identifying a particular source address that sends more than a specified number of probes;
 modeling and detecting surveillance scans performed by a particular source address by identifying a source address that generates more than a specified number of probes within a specified time period;
 modeling and detecting surveillance scans performed by one source IP address by identifying a source address that sends probes to more than a specified number of destinations;
 modeling and detecting surveillance scans performed by a particular source address by identifying a source address that sends probes to a specified set of destinations;
 modeling and detecting surveillance scans performed by a particular source address by identifying a source address that sends probes to specified ports; and
 modeling and detecting surveillance scans performed by a particular source address by identifying a source address that sends probes to a number of destinations in excess of a specified limit within a specified time period.

16. The system of claim 15, wherein said processor further processes one or more of said detected surveillance scans to detect a group of scanning hosts by modeling and detecting scans distributed across a series of source addresses by grouping addresses, said grouping of addresses being performed by subtracting one address from another and placing the two addresses in the same group if the difference is less than a specified amount.

17. The system of claim 15 wherein the processor is further programmed to perform the steps of:
 limiting the number of detected scans by reporting only source addresses that perform more than a specified number of probes within a specified time; and
 limiting the number of detected scans by reporting only source address groups that perform more than a specified number of probes within a specified time.

18. The system of claim 13 wherein the processor is also programmed to perform at least one of the following steps:
 identifying packets that have a particular arrangement of flags set;
 identifying packets that have all flags set;
 identifying packets that have payloads smaller than a predetermined size;
 identifying packets to which there is no response.

19. The system of claim 13 wherein the processor is further programmed to perform at least one of the following steps:
   identifying detected connections with fewer packets than a predetermined limit;
   identifying detected connections with packets that have traveled only from a source to a destination;
   identifying detected connections with packets that have traveled only from the destination to the source; and
   identifying detected connections with packets whose payloads are smaller than a predetermined limit.

* * * * *